United States Patent [19]
Okuma

[11] 3,859,517
[45] Jan. 7, 1975

[54] MARKED LINE FOLLOWING DEVICE PROVIDED WITH MEANS FOR DETECTING BOTH THE CENTER AND THE PRESENCE OF THE LINE

[75] Inventor: Toshiyuki Okuma, Tokyo, Japan

[73] Assignee: Fiji Photo Film Co., Ltd., Kanagawa, Japan

[22] Filed: Mar. 26, 1973

[21] Appl. No.: 344,663

[30] Foreign Application Priority Data
Mar. 27, 1972  Japan................................ 47-30496

[52] U.S. Cl................................. 250/202, 318/577
[51] Int. Cl........................................... G06k 11/02
[58] Field of Search...................... 250/202; 318/577

[56] References Cited
UNITED STATES PATENTS
3,135,904   6/1964   Purkhiser..................... 250/202 X
3,395,282   7/1968   Blackwell....................... 318/577 X Primary Examiner—James W. Lawrence
Assistant Examiner—T. N. Grigsby
Attorney, Agent, or Firm—Sughrue, Rothwell, Mion, Zinn & Macpeak

[57] ABSTRACT

Apparatus for following a line marked on a flat surface having a first and a second detecting means for detecting the presence of the line and the center thereof, respectively, further having an optical system where the optical axis is moved to find the marked line and a driving means for moving the apparatus according to the output signal of the second detecting means so as to constantly detect the center of the line.

10 Claims, 5 Drawing Figures

Patented Jan. 7, 1975 3,859,517

MARKED LINE FOLLOWING DEVICE PROVIDED WITH MEANS FOR DETECTING BOTH THE CENTER AND THE PRESENCE OF THE LINE

BACKGROUND OF THE INVENTION

1. Field of the Invention

This invention relates to a device for following a marked line, and more particularly to a marked line following device provided with a detecting means which determines if and confirms that an optical system provided therein to follow the marked line is in a position to follow the line.

2. Description of the Prior Art

It is known in the art, especially in ship building, can manufacturing and bridge building wherein sheet metal processing is necessary, to use a device which follows a marked line on sheet metal and at the same time processes the sheet metal along the marked line. Conventional devices for following the marked line are disadvantageous in that it cannot be confirmed if the optical system for following the marked line is in the right position to follow the line. This is because of the construction of such devices where the optical system faces the sheet metal under the casing thereof and, accordingly, cannot be seen from above. It has been necessary, therefore, to provide a means for confirming that the optical system is in alignment with the marked line or in a position able to follow the marked line.

SUMMARY OF THE INVENTION

In order to make a device to follow a marked line, a pair of photoelectric elements of the same performance are provided to detect the displacement of the center of the marked line from the axis of an optical system by projecting an image of the marked line onto the space between the pair of photoelectric elements and detecting the differential output of the elements. By amplifying the output of the photoelectric elements to operate a steering mechanism and to thereby correct the displacement of the optical axis from the marked line by means of a servo mechanism, the marked line can be automatically followed. Photoelectric tubes, photomultipliers, photodiodes, phototransistors, phtoconductive elements, photocells, etc., can be used as the photoelectric elements. Among these photoelectric elements, photodiodes having a small size and a small light receiving portion are the best employed for this purpose. Further, the performance of the pair of photoelectric elements is required to be the same as mentioned above in order that the output of the elements is not affected by variations in the density of the marked line and/or the background of the marked line.

By using an additional pair of photoelectric elements for detection, it is possible to detect the presence of the marked line within the range where the line following device is able to follow the marked line. The position of the additional pair of photoelectric elements should be out of alignment with the pair of photoelectric elements for detection serving to follow the line.

The primary object of the present invention is to provide a device for following a marked line provided with a detecting means which detects the presence of the marked line within the range whereby the line can be automatically followed.

Another object of the present invention is to provide a device for following a marked line including a pair of photoelectric elements to follow the marked line equipped with another pair of photoelectric elements to detect the presence of the marked line within a predetermined range.

A further object of the present invention is to provide a device for following a marked line provided with a processing machine to process the sheet metal bearing the marked line.

A brief summary of the present invention will be helpful for a better understanding thereof. In order to accomplish the above enumerated objects of the present invention, the device for following a marked line in accordance with the present invention employs two sets of photoelectric element pairs disposed out of alignment with each other so that one set of photoelectric element pairs serves to follow the marked line and the other set serves to detect the presence of the marked line within a predetermined range.

The first set of photoelectric elements are connected with an automatic steering mechanism to move the device along the marked line and the second set of photoelectric elements disposed out of alignment with the first set of elements are connected with a line detecting means for detecting the presence of the line within a predetermined range.

Accordingly, the device in accordance with the present invention is operated in such a manner that the marked line is first detected by putting the device substantially on the line if the line is accurately under the position to be followed or processed by a processing machine connected therewith, and if not, the device is brought to such a position, and then the marked line is followed automatically. The bringing of the device to such a position can be conducted by an automatic steering mechanism connected with the detecting photoelectric elements or manually.

The following of the device along the line is conducted by an automatic steering mechanism connected with the following photoelectric elements. The set of photoelectric elements comprises a pair of photoelectric elements arranged side by side to receive light incident thereon. The boundary of adjacent photoelectric elements is made out of alignment between the following elements and the detecting elements. In the case of the following elements, the output of the set of elements is controlled so that the difference between the outputs of the adjacent elements is minimized because the existence of a difference therebetween means that the center of the marked line is out of alignment with the boundary of the adjacent elements. By keeping this difference minimized, the center of the marked line is kept in alignment with the boundary of the adjacent elements and the device is correctly guided to follow the line.

Other objects, features and advantages of the present invention will be made apparent from the following detailed description of a preferred embodiment thereof taken in conjunction with the accompanying drawing in which:

DETAILED DESCRIPTION OF THE INVENTION

Figure 1:
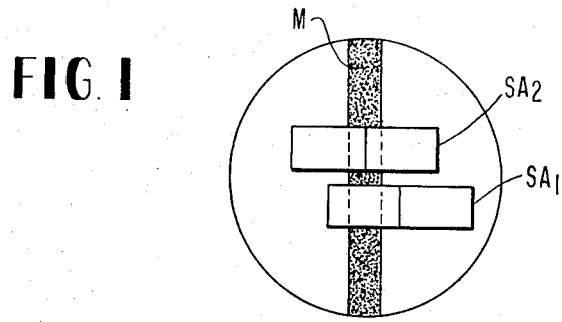
FIG. 1 is a plan view showing the arrangement and position of the two sets of photoelectric element pairs employed in the present invention.

Referring to FIG. 1, the reference character $SA_1$ indicates a pair of detecting photoelectric elements for detecting the presence of the marked line M within a predetermined range, and the reference character $SA_2$ indicates a pair of line following photoelectric elements to detect the position of the center of the marked line M for controlling the device to follow the line. Each of the elements of the line following set $SA_2$ and each of the elements of the detecting set $SA_1$ has the same performance as mentioned hereinbefore. Of course, it is not necessary to equalize the elements $SA_1$ and $SA_2$ to each other.

The elements are connected with an electric circuit to provide an output representing the difference in resistance between adjacent elements. The boundary of the adjacent photoelectric elements of the line following set $SA_2$ is located out of alignment with the boundary of the adjacent photoelectric elements of the detecting set $SA_1$. The relative position of the two sets of photoelectric elements is shown in FIG. 1.

In FIG. 1, the position of both sets of elements $SA_1$ and $SA_2$ relative to the position of the marked line M (exactly, the position of the light image projected on the plane of the elements) is in its most desirable condition, wherein the image of the marked line M is on the left element of the line detecting set $SA_1$ to make the maximum differential output and the center of the image of the line M is in alignment with the boundary of the adjacent elements of the line following set $SA_2$ to make the minimum differential output.

In the operation of the device in accordance with the present invention employing photoelectric elements arranged as described above, the device is first placed on a sheet metal bearing a marked line at about the position where the optical detecting means provided therein faces the marked line. The optical system including the photoelectric elements is movable in the device to enable the optical system to be set correctly on the marked line. If the optical system cannot be set to direct the marked line within the movable range thereof, the device is lifted and put on the sheet metal at a different position. The device can be repeatedly put on the sheet metal at different positions until the line detecting elements are brought to a position where the line is detected by the elements as shown in FIG. 1. After the elements $SA_1$ are brought to the position as shown in FIG. 1, the line is detected by the line following elements $SA_2$ and the device automatically follows the line.

Figure 2:
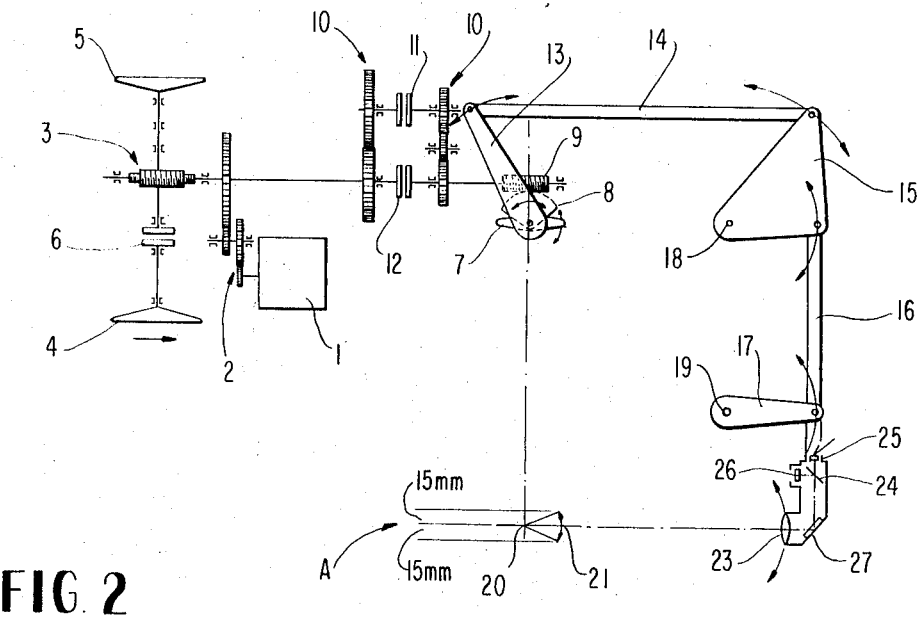
FIG. 2 is a schematic plan view showing the arrangement of the line following device in accordance with one embodiment of the invention.

Referring now to FIG. 2 showing the construction of the line following device in accordance with the present invention, a D.C. motor 1 is provided with a reduction gear 2 associated with a worm mechanism 3. The reference numerals 4 and 5 indicate a pair of rear wheels in which one rear wheel 4 is a driving wheel and the other rear wheel 5 is a follower wheel. Between the rear driving wheel 4 and the rear follower wheel 5 there is provided a clutch 6 for transmitting the rotation of the worm gear mechanism 3 to the driving wheel 4.

Reference numeral 7 indicates a front wheel rotatably supported on a shaft connected by way of a rack gear 8 to a worm gear 9 which in turn is associated with the reduction gear 2 via forward-reverse switching gear mechanism 10. The forward-reverse switch gear mechanism 10 includes a forward clutch 11 and a reverse clutch 12. By engagement of one of the clutches 11 and 12, the worm gear 9 is rotated to rotate the rack gear 8, and accordingly the front wheel 7 fixed thereto, in a clockwise or counterclockwise direction as indicated by the arrows in FIG. 2.

A first link lever 13 is fixed to the rack gear 8 and linked with a second link lever 14 which is in turn linked with a link plate 15. Reference numeral 16 indicates a third link lever linked with the link plate 15 at one end thereof and linked with a fourth link lever 17 at a portion near the other end thereof. The link plate 15 and the fourth lever 17 are pivotally mounted on the body of the device at pivots 18 and 19 so that the plate 15 and lever may be rotated as shown by the arrows in FIG. 2.

At the other end of the third link lever 16 there is provided an optical system for detecting the marked line. The optical axis of the optical system is inclined with respect to the surface of the sheet metal bearing the marked line to be followed thereby. The line connecting the axis of rotation of the rack gear 8 (which is the same as the axis of turning of the front wheel 7) and the pivot 18 is perpendicular to the axis of rotation of the rear wheels 4 and 5. A straight line connecting the pivots 18 and 19 is parallel to the axis of rotation of said rear wheels 4 and 5.

Regardless of the direction of the front wheel 7, the third link lever 16 is kept parallel with the axis of rotation of the rear wheels 4 and 5, and the projected image of the optical axis of the optical system is constantly kept perpendicular to the axis of rotation of the rear wheels 4 and 5.

The intersection of the projected image on the sheet metal of the optical axis and the straight line extending from the axis of turning of the front wheel 7 in parallel to the axis of rotation of the rear wheels 4 and 5 is the point at which a processing machine operates on the sheet metal (hereafter called the "cutting point") 20. The intersection of the optical axis with the sheet metal is the detecting point 21. It is, of course, desirable to put the cutting point 20 on a line to be traced. When the line is straight the point 20 can be put on the line, but when curved, detecting point 21 will not coincide with the cutting point 20 so that it is necessary to minimize the difference between the above two points. By satisfying the formula below, this minimization can be obtained.

Figure 4:
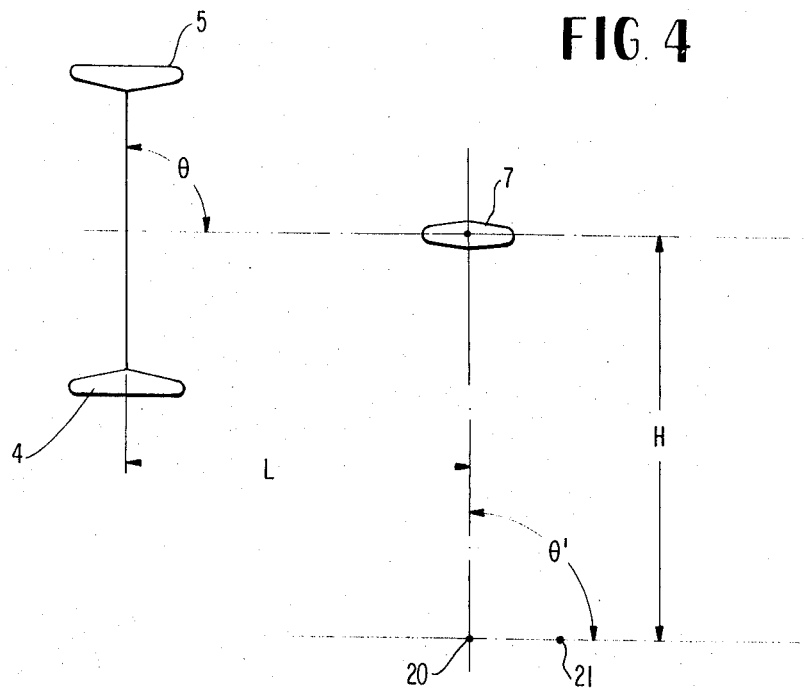
FIGS. 4 and 5 are schematic presentations of certain relationships between parameters of the present invention.

The cutting point 20 and the detecting point 21 are on the straight line when the front wheel 7 is directed perpendicular to the axis of rotation of the rear wheels 4 and 5. The links are so arranged that the following formula is constantly satisfied:

$$\left| \tan \theta' - \tan \theta \right| = H/L$$

where $\theta$ is the angle made by the direction of the front wheel 7 and the axis of rotation of the rear wheels 4 and 5, $\theta'$ is the angle made by the direction of the front wheel 7 and the line connecting the cutting point 20 and the detecting point 21, H is the distance between the steering axis (the center of rotation of the front wheel when rotating the worm 9) of the front wheel and the cutting point, and L is the distance between the axis of rotation of the rear wheels 4 and 5 and the steering axis of the front steering wheel 7, provided that $\theta \neq 90°$. It should be noted that either $\theta$ can be $\theta'$, i.e., their relationship can be reversed in the above formula, since the left side of the formula represents an absolute value. This relationship is schematically shown in FIG. 4.

Figure 5:
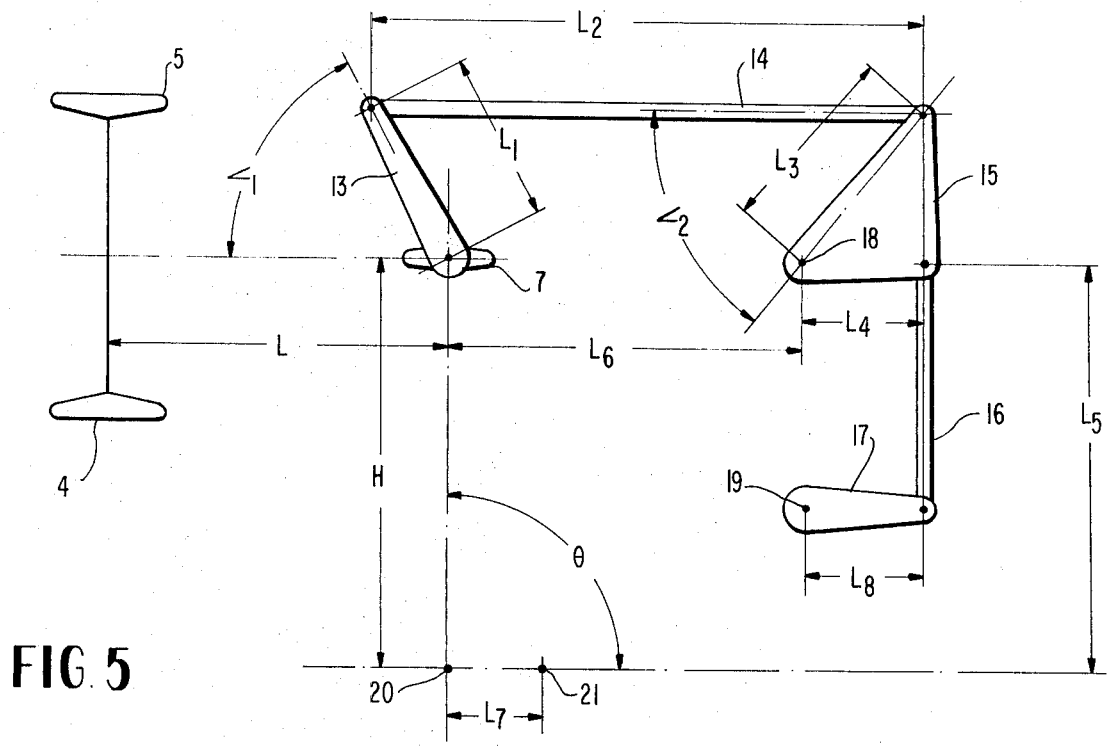

For instance, assuming that $L = 250$ mm, $H = 150$ mm, the length of the first link lever 13 is 40 mm, the length of the second link lever 14 is 115.06 mm, the distance between the pivot of the link plate 15 with the second link lever 14 and the pivot 18 of the plate 15 is 40 mm, and the angle between the axis of rotation of the rear wheels 4 and 5 and the first link lever 13 when $\theta' = 90°$ and between the axis of rotation of the rear wheels 4 and 5 and the line connecting the pivot 18 and the pivot of the link plate 15 with the second link lever are both 43.5°, a line connecting the pivot 18 on the link plate 15 and the pivot of the link plate 15 with the third link lever 16, and the line connecting the two pivots of fourth link lever 17 are both perpendicular to the axis of rotation of the rear wheels 4 and 5, and both are 30 mm in length. The distance between the pivot of the link plate 15 with the third link lever 16 and the optical axis of the optical system is equal to H. The distance between the steering axis or the axis of turning of the front wheel 7 and the pivot 18 is 60 mm, and the distance between the cutting point 20 and the detecting point 21 is 30 mm. This embodiment is schematically shown in FIG. 5, where $L = 250$, $H = 150$, $L_1 = 40$, $L_2 = 115.06$, $L_3 = 40$, $L_4 = L_8 = 30$ ($\perp$ to lines 4–5), $\theta^1 = 90°$, $<_1 = <_2 = 43.5$, $L_5 = H$, $L_6 = 60$ and $L_7 = 30$.

The function of numerals 23 to 27 will be explained in detail in the following material.

Figure 3:
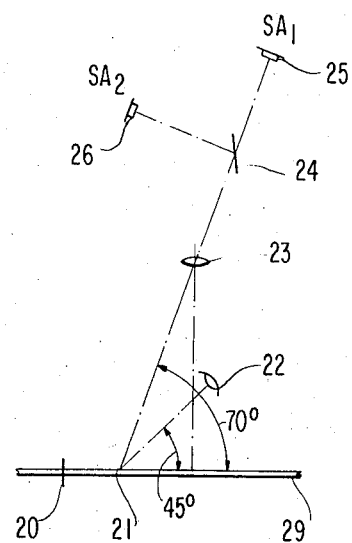
FIG. 3 is a vertical view schematically showing the optical system employed in the device for following a marked line in accordance with the present invention.

Now referring to FIG. 3 showing the elevational view of the optical system employed in the device of the present invention, the reference numeral 22 indicates a light source for illumination to illuminate the surface of the sheet metal, 23 indicates a lens, 24 a half mirror or partial reflective mirror, 25 a first detecting element corresponding to detecting set $SA_1$, 26 a second detecting element corresponding to following set $SA_2$, 27 a mirror (See FIG. 2), and 29 indicates a sheet metal or steel plate bearing thereon a marked line to be detected. Numerals 20 and 21 have the same meaning as heretofore explained.

The optical axis of the optical system is inclined with respect to the surface of the steel plate or sheet metal by 70° and the light source 22 illuminates the detecting point at an angle of 45°. The marked line represents light projected on the detecting elements 25 and 26 by means of the lens 23. As for the detecting elements 25, 26, receptor diode OD72P (made by Oki Electric Co., Ltd.) having a construction including two diodes arranged in a side by side relationship can be used. This type of photodiode has a fast response speed in comparison with other photoreceptors such as CdS.

Although in FIG. 1 the photoelectric elements $SA_1$ and $SA_2$ are illustrated as separated from each other to better explain the invention, it is practically preferred to detect the same portion of the marked line with the two detecting elements using a half mirror, for instance, as shown in FIG. 3, in order to perform as faithful a following as possible.

In operation, the device is placed on the surface of the steel plate 29 bearing the marked line M to be detected at such a position that the detecting point is substantially in alignment with the marked line and a starting button is depressed to turn on the light source 22 and energize amplifiers (not shown) for the detecting elements 25 and 26, and the D.C. motor 1 is started to rotate the worm 9 by way of the clutch 12. The rotation of the worm 9 moves the optical axis of the optical system in one direction (either direction can be selected) by way of rack gear 8 and the linkages. When the first detecting element 25 detects the marked line illuminated by the light source 22 as shown in FIG. 3, the differential output of the first detecting element 25 ($SA_1$) or the difference between the outputs of the pair of photoelectric elements of the detecting set $SA_1$ becomes over a predetermined value and preparations for following the line are completed.

Then, as a following switch is depressed, the second detecting element 26 ($SA_2$) detects the center of the marked line and the clutch 6 is connected to rotate the driving wheel 4 by transmitting the rotation of the motor 1 thereto, and the rear wheels 4 and 5 move the device rightward in FIG. 2. When the first element 25 does not detect or find the marked line, the reverse clutch 12 is cut off after moving the optical axis by a predetermined angle and the forward clutch 11 is actuated to move the optical axis in the opposite direction. After the marked line is found or detected by the detecting element 25 ($SA_1$), the device completes the preparation for following the line and starts to operate as a line follower as described above.

In the case where the device cannot find the marked line even if the optical axis is moved back and forth, the device is picked up and placed on the sheet metal at different position repeatedly until the marked line is found.

After the first detecting element 25 has found the marked line, the clutches 11 and 12 are turned off electrically by a signal coming from the pair of detecting elements of the following set $SA_2$ or second detecting element 26 to move the optical system so that the optical system is constantly controlled to follow the marked line by making the differential output from the following set or second detecting element 26 minimum (line centered on the boundary of the pair of detecting elements of the following set $SA_2$).

Simultaneously with moving the optical system, the front wheel 7 of the device is controlled to direct along the line to guide the device along the marked line. Thus, the device is guided along the marked line by turning the clutch es 11 and 12 on and off to correct the direction of the front wheel 7. Further, since the mechanism includes a linkage and is controlled by the servomechanism constantly satisfy the heretofore given formula, the cutting point is hardly moved out of the marked line and accurately follows the line. Therefore, by providing a burner for cutting the metal sheet at the cutting point, it becomes possible to cut the sheet metal along the marked line.

By using one specific apparatus of the above described embodiment of the present invention, it has proven possible to a tomatically follow a marked line having a width of over 3.5 mm with an accuracy of ± 0.5 mm from the center of the line with a minimum radius of the line which can be followed thereby of 800 mm and with a maximum radius of the range in which the line can be found and followed automatically of 15 mm. The "15 mm" value which represents the maximum radius of the first detecting elements in the left and right directions is schematically shown in FIG. 2 at point A when the first elements scan a steel plate. In FIG. 2, scanning ranges of the point 21 are shown by arrows.

Although the above description of the invention has been made with reference to a particular embodiment thereof, it will be apparent that various modifications and variations can be effected within the spirit and scope of the present invention as defined in the appended claims.

For example, the detection of the marked line is automatically conducted using clutch means; it is possible to use an indication lamp which indicates that the device is on the sheet metal at a correct position to follow the marked line so that the position of the device can be known by seeing the lamp turned on when the device is manually placed on the metal sheet at different positions.

It will be understood that the set value of the differential output of the element $SA_1$, that is the output difference between the pair of photoelectric elements detecting the presence of the marked line, must be determined so that the operation of the device will not be affected by variations in the density of the marked line or the background thereof, and the device will accurately follow the marked line.

Further, it is preferred to provide a means to indicate when the device has come to the end of the marked line or has moved out of the line at a fault by using the detecting element $SA_1$. For example, it is possible to provide an indication lamp or an automatic stopping device which is energized in response to a decrease of the output of the element $SA_1$ to below a predetermined value. Such a device is also advantageous in reducing mis-operation of the device for instance, in the case of coming to a blurred line or an extinguished line.

In addition, it is preferred to provide a delay means in the detecting mechanism so that the device will not stop each time it comes to a small unclear part of the line, in order to prevent a reduction in the operation efficiency of the device. The delay time is, of course, selected taking the following speed (the speed of the device according to the invention during tracing the marked line; the speed depends, of course, on the revolution of the motor 1) into consideration in order to make the device operate at maximum efficiency.

While the invention has been described in detail and with reference to specific embodiments thereof, it will be apparent to one skilled in the art that various changes and modifications can be made therein without departing from the spirit and scope thereof.

What is claimed is:

1. A device for following a line marked on a flat surface comprising:
    a first detecting means comprising a first pair of adjacent photoelectric elements for detecting the presence of the marked line thereunder,
    a second detecting means comprising a second pair of adjacent photoelectric elements for detecting the center of the marked line,
    an optical system provided in the device for projecting an optical image of the marked line on both said detecting means and associated with said first detecting means so that the optical axis thereof is moved to find the marked line when said first detecting means does not find the marked line,
    a driving means for moving the device according to the output signal of said second detecting means so that the device will be moved in such a direction that the second detecting means constantly detects the center of the marked line, 2. A marked line following device as claimed in claim 1 further comprising means for indicating that the first detecting means detects the presence of the marked line.

3. A marked line following device as claimed in claim 2 wherein said indicating means is a lamp which is energized when the marked line is detected.

4. A marked line following device as claimed in claim 1 wherein the boundary of the pair of photoelectric elements of said first detecting means is located out of alignment with the boundary of the pair of photoelectric elements of said second detecting means.

5. A marked line following device as claimed in claim 4 wherein the first detecting means and the second detecting means are made to detect the same portion of the marked line by using a half transparent mirror in the optical system to direct a part of the light reflected from the line to said first detecting means and direct a part of the light from the line to said second detecting means.

6. A marked line following device as claimed in claim 1 wherein said driving means comprises a steering means connected with a mechanical servosystem which is operated according to the output of said second detecting means, and a driving wheel connected with a motor.

7. A marked line following device as claimed in claim 6 wherein said driving wheel is associated with a means for stopping the rotation of the wheel operated in response to a decrease in the output of said first detecting means down to a predetermined level, whereby the device is automatically stopped when the device comes to a position where the line is unclear or extinguished.

8. A marked line following device as claimed in claim 7 wherein said stopping means is provided with a delay means.

9. A marked line following device as claimed in claim 1 wherein each pair said adjacent photoelectric elements have the same performance.

10. A device for following a line marked on a surface comprising: an optical system for detecting the marked line and including two pairs of photoelectric elements, the elements of each pair being connected to have a differential output and being arranged in side by side relationship to form a boundary therebetween, the boundaries of said two pairs of photoelectric elements being out of alignment in said optical system, a steering mechanism which is controlled to minimize the differential output from one of said pairs of photoelectric elements, and a driving mechanism which drives the device when the differential output from the other of said pairs of photoelectric elements is over a predetermined level.

* * * * *